United States Patent Office 3,833,727
Patented Sept. 3, 1974

---

3,833,727
HYDRALAZINE AND β-ADRENERGIC BLOCKING AGENT COMPOSITIONS FOR TREATING HYPERTENSION
Carl E. Nelson and Alexander Scriabine, Ambler, Pa., assignors to Merck & Co., Inc., Rahway, N.J.
No Drawing. Filed Mar. 6, 1972, Ser. No. 232,294
Int. Cl. A61k 27/00
U.S. Cl. 424—248     12 Claims

ABSTRACT OF THE DISCLOSURE

Enhancement of the antihypertensive activity of hydralazine by the co-administration with a β-adrenergic blocking agent.

CROSS REFERENCE TO RELATED APPLICATIONS

None.

This invention relates to the enhancement of the antihypertensive action of hydralazine by co-administration with a β-adrenergic blocking agent. Also, the invention relates to pharmaceutical compositions which contain hydralazine and a β-adrenergic blocking agent as active ingredients and the methods of treating hypertension conditions in patients by administering said pharmaceutical compositions.

Hydrazine is an effective antihypertensive agent when used in combination with other drugs in the treatment of patients with moderate to severe, essential or renal hypertension. The primary effect is on diastolic blood pressure as a result of arteriolar vasodilatation thereby reducing peripheral vascular resistance. The pressor effect of angiotensin and norepinephrine are believed to be partially blocked by hydralazine. Hydralazine should not be used as the sole therapy of even mild to moderately severe disease since it is rarely completely effective and side effects are frequently troublesome when no other therapy is used. The side effects of headache, palpitations and tachycardia occur usually during initial therapy and frequently disappear to some extent as therapy is continued. The effect of direct-acting peripheral vasodilators in hypertension, typified by hydralazine, is limited by reflex increases in cardiac output.

In accordance with this invention, it is found that the co-administration of hydralazine and a β-adrenergic blocking agent results in an enhanced anti-hypertensive effect of hydralazine in the treatment of labile and mild to severe hypertension. Also, it is found that the co-administration of these agents minimize the emergence of certain side effects induced by the hydralazine, specifically palpitations and tachycardia. This salutary effect is induced by a reduction in cardiac output.

The β-adrenergic blocking agents and its optically active isomers employed in this invention are represented by Formula I below:

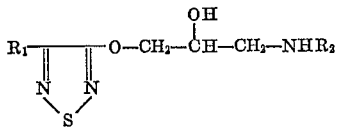

I or pharmaceutically acceptable salts thereof wherein $R_1$ is hydrogen,; halogen such as chlorine, bromine, fluorine and the like; alkyl such as methyl, ethyl, propyl, t-butyl and the like; alkenyl such as vinyl, allyl, methallyl and the like; Y—X—Z— radical wherein Y is alkyl such as methyl, ethyl, propyl; phenyl or substituted phenyl wherein the substituents are selected from the group consisting of halogen such as chlorine, bromine, fluorine and the like, hydroxy, alkyl such as methyl, ethyl, propyl and the like, or alkoxy such as methoxy, ethoxy, propoxy and the like; X is oxygen or sulfur and Z is alkyl such as methyl and ethyl; carbamoyl; alkylcarbamoyl wherein the alkyl moiety is represented by methyl, ethyl, isopropyl, butyl and the like; cycloalkyl such as cyclopropyl, cyclobutyl, cyclopentyl, cyclohexyl and the like; alkoxy such as methoxy, ethoxy, propoxy, isopropoxy, butoxy, pentoxy and the like; phenyl or substituted phenyl wherein the substituents are selected from the group consisting of one or more halogen such as chlorine, fluorine and the like, alkyl having from 1 to 3 carbons, and alkoxy having from 1 to 3 carbons; aralkyl wherein the alkyl moiety has from 1 to 4 carbons and the aryl moiety can be unsubstituted or substituted with one or more halogen such as chlorine, fluorine, bromine and the like, alkyl having from 1 to 3 carbons, or alkoxy having from 1 to 3 carbons; and a heterocyclic moiety such as aziridinyl, azetidinyl, pyrrolidyl, piperidyl, hexahydroazepino, morpholino, piperidino, thiazolidinyl, p-thiazinyl, piperazinyl and the like; $R_2$ is alkyl having from 1 up to about 20 carbons but preferably having from 3 to 6 carbons such as isopropyl, tert-butyl, 2,2-dimethylpropyl and the like; alkenyl such as allyl, vinyl, methallyl and the like; or alkynyl groups having from 2 to 6 carbons, such as propynyl, butynyl, propargyl and the like; substituted alkyl wherein the substituents are selected from the group consisting of hydroxy and halogen such as chlorine, bromine and the like; carboxy; alkoxy; alkylthio wherein the alkyl moiety contains from 1 to 4 carbons; di-loweralkyl ($C_{1-3}$) amino wherein the alkyl groups optionally can be joined together through a hetero atom, such as oxygen, nitrogen or sulfur to form a heterocyclic group such as pyrrolidinyl, piperazinyl, morpholino, thiazolidinyl or thiazinyl.

Representative compounds within the scope of this invention are:

3-chloro-4-(3-t-butylamino-2-hydroxypropoxy)-1,2,5-thiadiazole
(+)-3-chloro-4-(3-t-butylamino-2-hydroxypropoxy)-1,2,5-thiadiazole hydrochloride
(−)-3-chloro-4-(3-t-butylamino-2-hydroxypropoxy)-1,2,5-thiadiazole hydrochloride
3-bromo-4-(3-t-butylamino-2-hydroxypropoxy)-1,2,5-thiadiazole
(+)-3-bromo-4-(3-t-butylamino-2-hydroxypropoxy)-1,2,5-thiadiazole hydrochloride
(−)-3-bromo-4-(3-t-butylamino-2-hydroxypropoxy)-1,2,5-thiadiazole hydrochloride
3-(4-hydroxypiperidino)-4-(3-t-butylamino-2-hydroxypropoxy)-1,2,5-thiadiazole
3-morpholino-4-(3-t-butylamino-2-hydroxypropoxy)-1,2,5-thiadiazole hydrogen maleate
(+)-3-morpholino-4-(3-t-butylamino-2-hydroxypropoxy)-1,2,5-thiadiazole hydrogen maleate
(−)-3-morpholino-4-(3-t-butylamino-2-hydroxypropoxy)-1,2,5-thiadiazole hydrogen maleate
3-morpholino-4-(3-t-butylamino-2-hydroxypropoxy)-1,2,5-thiadiazole hydrochloride
3-N-t-butylcarbamoyl-4-(3-t-butylamino-2-hydroxypropoxy)-1,2,5-thiadiazole
(+)-3-N-t-butylcarbamoyl-4-(3-t-butylamino-2-hydroxypropoxy)-1,2,5-thiadiazole hydrochloride
(−)-3-N-t-butylcarbamoyl-4-(3-t-butylamino-2-hydroxypropoxy)-1,2,5-thiadiazole hydrochloride
3-N-isopropylcarbamoyl-4-(3-isopropylamino-2-hydroxypropoxy)-1,2,5-thiadiazole
(+)-3-N-isopropylcarbamoyl-4-(3-isopropylamino-2-hydroxypropoxy)-1,2,5-thiadiazole hydrochloride
(−)-3-N-isopropylcarbamoyl-4-(3-isopropylamono-2-hydroxypropoxy)-1,2,5-thiadiazole hydrochloride 3-morpholino-4-(3-t-butylamino-2-hydroxypropoxy)-1,2,5-thiadiazole benzoate
3-chloro-4-(3-isopropylamino-2-hydroxypropoxy)-1,2,5-thiadiazole
3-bromo-4-(3-isopropylamino-2-hydroxypropoxy)-1,2,5-thiadiazole
(+)-3-chloro-4-(3-isopropylamino-2-hydroxypropoxy)-1,2,5-thiadiazole
3-methyl-4-(3-butylamino-2-hydroxypropoxy)-1,2,5-thiadiazole
3-ethoxy-4-(3-butylamino-2-hydroxypropoxy)-1,2,5-thiadiazole.

The compounds of this invention are administered orally at dose quantities ranging at ratios from about 1:1 to 1:10 (β-adrenergic blocking agent to hydralazine) by weight of the composition. The β-adrenergic blocking agent is administered at quantities ranging from about 0.03 mg./kg. to 0.15 mg./kg. of body weight. Hydralazine is administered at quantities ranging from 0.03 mg./kg. to 1.5 mg./kg. of body weight. Of particular preference is the combination of 0.07 mg./kg. to 0.1 mg./kg. of body weight of the β-adrenergic blocking agent and 0.7 mg./kg. to 1.0 mg./kg. of body weight of hydralazine. The composition is administered for varying periods of treatment as required. The β-adrenergic blocking agent is administered at quantities ranging from about 2 mg. to 10 mg. Hydralazine is administered at quantities from about 2 mg. to 100 mg. Of particular preference is the administration of the composition which contains 5 mg. of the β-adrenergic blocking agent and 50 mg. of hydralazine four times a day. The formulations included herein are effective in the treatment of hypertension conditions in patients. If desired, the active ingredients may be combined in a single mode of administration.

It will be understood, however, that the specific dose level for any particular patent will depend upon a variety of factors including the activity of the specific compound employed, the age, body weight, general health, sex, diet, time of administration, rate of excretion, drug combination and the severity of the disease undergoing therapy.

The pharmaceutically acceptable salts of the compounds included herein are to be considered within the scope of the invention. Representative examples of said pharmaceutically acceptable salts are the hydrochlorides, hydrobromides, phosphates, sulfates, oxalates, lactates, malates, maleates, formates, acetates, succinates, tartrates, salicylates, citrates, phenylacetates, benzoates, p-toluenesulfonates and other salts such as those that provide relatively insoluble products that afford a slow release of the active material, for example, a 1,1'-methylene-bis-(2-hydroxy-3-naphthoate) and the like.

The β-adrenergic blocking agent employed in this invention are known from allowed U.S. application Ser. No. 818,090, now U.S. 3,655,663, and its corresponding Belgium Pat. No. 733,390. Also, processes for the preparation of the various β-adrenergic blocking agents are found in said U.S. application Ser. No. 918,090 and Belgium Pat. No. 733,390.

The following examples illustrate the preparation of the various compositions of the invention. The examples should be construed as illustrations of the invention rather than limitations thereof.

TABLE I

| Example | 1 | 2 | 3 | 4 | 5 | 6 |
|---|---|---|---|---|---|---|
| Ingredients: | | | | | | |
| 3-morpholino-4-(3-t-butylamino-2-hydroxypropoxy)-1,2,5-thiadiazole | 10 | 10 | 10 | 5 | 5 | 5 |
| Hydralazine | 10 | 25 | 50 | 10 | 25 | 50 |
| Starch, U.S.P., corn | 124 | 114 | 109 | 99 | 84 | 80 |
| Microcrystalline cellulose | 134 | 129 | 109 | 85 | 85 | 54 |
| Magnesium stearate | 2 | 2 | 2 | 1 | 1 | 1 |
| Total (mg./tablet) | 280 | 280 | 280 | 200 | 200 | 200 |

3-morpholino-4-(3-t-butylamino-2-hydroxypropoxy)-1,2,5-thiadiazole, hydralazine, part of the corn starch and microcrystalline cellulose are mixed together, milled and granulated with part of the corn starch as starch paste. The granulated mass is wet-sized, dried, dry milled, and blended with the remaining corn starch and microcrystalline cellulose, lubricated with magnesium stearate, and compressed into tablets.

When other β-adrenergic blocking agents such as 3-chloro-4-(3-t-butylamino-2-hydroxypropoxy)-1,2,5-thiadiazole,
3-(4-hydroxypiperidino)-4-(3-t-butylamino-2-hydroxypropoxy)-1,2,5-thiadiazole,
3-piperazino-4-(3-t-butylamino-2-hydroxypropoxy)-1,2,5-thiadiazole,
3-piperidino-4-(3-t-butylamino-2-hydroxypropoxy)-1,2,5-thiadiazole,
3-N-isopropylcarbamoyl-4-(3-t-butylamino-2-hydroxypropoxy)-1,2,5-thiadiazole,
3-N-isopropylcarbamoyl-4-(3-isopropyl-amino-2-hydroxypropoxy)-1,2,5-thiadiazole,
3-methyl-4-(3-t-butylamino-2-hydroxypropoxy)-1,2,5-thiadiazole,
3-ethoxy-4-(3-t-butylamino-2-hydroxypropoxy)-1,2,5-thiadiazole or representative salt thereof is substituted for 3-morpholino-4-(3-t-butylamino-2-hydroxypropoxy)-1,2,5-thiadiazole, there is obtained the corresponding composition.

TABLE II

| Example | 7 | 8 | 9 | 10 | 11 | 12 |
|---|---|---|---|---|---|---|
| Ingredients: | | | | | | |
| 3-morpholino-4-(3-t-butylamino-2-hydroxypropoxy)-1,2,5-thiadiazole hydrogen maleate | 10 | 10 | 10 | 5 | 5 | 5 |
| Hydralazine | 10 | 25 | 50 | 10 | 25 | 5 |
| Starch, U.S.P., corn | 124 | 114 | 109 | 99 | 84 | 8 |
| Microcrystalline cellulose | 134 | 129 | 109 | 85 | 85 | 5 |
| Magnesium stearate | 2 | 2 | 2 | 1 | 1 | 1 |
| Total (mg./tablet) | 280 | 280 | 280 | 200 | 200 | 200 |

-3-morpholino-4-(3-t-butylamino-2-hydroxypropoxy)-1,2,5-thiadiazole hydrogen maleate, hydralazine, part of the corn starch and microcrystalline cellulose are mixed together, milled and granulated with part of the corn starch as starch paste. The granulated mass is wet-sized, dried, dry milled, and blended with the remaining corn starch and microcrystalline cellulose, lubricated with magnesium stearate, and compressed into tablets.

When other optically active β-adrenergic blocking agents such as (−)-3-chloro-4-(3-t-butylamino-2-hydroxy-propoxy)-1,2,5-thiadiazole hydrochloride,
(−)-3-(4-hydroxy-piperidino)-4-(3-t-butylamino-2-hydroxypropoxy)-1,2,5-thiadiazole hydrochloride,
(−)3-piperidino)-4-(3-t-butylamino-2-hydroxypropoxy)-1,2,5-thiadiazole hydrogen maleate,
(−)-3-N-t-butylcarbamoyl-4-(3-t-butylamino-2-hydroxypropoxy)-1,2,5-thiadiazole hydrochloride,
(−)-3-methyl-4-(3-t-butylamino-2-hydroxypropoxy)-1,2,5-thiadiazole hydrochloride,
(−)-3-ethoxy-4-(3-t-butylamino-2-hydroxypropoxy)-1,2,5-thiadiazole hydrochloride or
(−)-3-chloro-4-(3-t-butylamino-2-hydroxypropoxy)-1,2,5-thiadiazole is substituted for -3-morpholino-4-(3-t-butylamino-2-hydroxypropoxy)-1,2,5-thiadiazole hydrogen maleate, there is obtained the corresponding composition.

TABLE III

| Example | 13 | 14 | 15 | 16 | 17 | 18 |
|---|---|---|---|---|---|---|
| Ingredients: | | | | | | |
| (+)-3-morpholino-4-(3-t-butyl-amino-2-hydroxypropoxy)-1,2,5-thiadiazole hydrogen meleate | 10 | 10 | 10 | 5 | 5 | 5 |
| Hydralazine | 10 | 25 | 50 | 10 | 25 | 50 |
| Starch, U.S.P., corn | 124 | 114 | 109 | 99 | 84 | 80 |
| Microcrystalline cellulose | 134 | 129 | 109 | 85 | 85 | 54 |
| Magnesium stearate | 2 | 2 | 2 | 1 | 1 | 1 |
| Total (mg./tablet) | 280 | 280 | 280 | 200 | 200 | 200 |

(+) - morpholino - 4 - (3-t-butylamino-2-hydroxypropoxy)-1,2,5-thiadiazole hydrogen maleate, hydralazine, part of the corn starch and microcrystalline cellulose are mixed together, milled and granulated with part of the corn starch as starch paste. The granulated mass is wet-sized, dried, dry milled, and blended with the remaining corn starch and microcrystalline cellulose, lubricated with magnesium stearate, and compressed into tablets.

When other optically active β-adrenergic blocking agents such as (+)-3-chloro-4-(3-t-butylamino-2-hydroxypropoxy)-1,2,5-thiadiazole hydrochloride,
(+)-3-(4-hydroxypiperidino)-4-(3-t-butylamino-2-hydroxypropoxy)-1,2,5-thiadiazole hydrochloride,
(+)-3-piperidino-4-(3-t-butylamino-2-hydroxypropoxy)-1,2,5-thiadiazole hydrochloride,
(+)-3-morpholino-4-(3-t-butylamino-2-hydroxypropoxy)-1,2-5-thiadiazole hydrochloride,
(+)-3-N-t-butylcarbamoyl-4-(3-t-butylamino-2-hydroxypropoxy)-1,2,5-thiadiazole hydrochloride,
(+)-3-methyl-4-(3-t-butylamino-2-hydroxypropoxy)-1,2,5-thiadiazole hydrochloride,
(+)-3-ethoxy-4-(3-t-butylamino-2-hydroxypropoxy)-1,2,5-thiadiazole hydrochloride, or
(+)-3-chloro-4-(3-t-butylamino-2-hydroxybutoxy)-1,2,5-thiadiazole hydrochloride is substituted for (+)-3-morpholino-4-(3-t-butylamino-2-hydroxypropoxy) - 1,2,5 - thiadiazole hydrogen maleate, there is obtained the corresponding composition.

As one skilled in the art would readily appreciate, other oral forms of administration such as capsules and aqueous suspensions or solutions are within the scope of this invention and may be prepared using techniques well known to the art.

What is claimed is:

1. A composition with enhanced anti-hypertensive activity which comprises an effective dosage having a ratio of from 1 to 10 parts by weight of hydralazine to 1 part by weight of a β-adrenergic blocking agent of the formula:

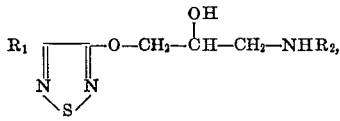

pharmaceutically acceptable salts or optically active isomers thereof wherein $R_1$ is hydrogen, halogen, alkyl, alkenyl, Y—X—Z— radical wherein Y is alkyl, phenyl or substituted phenyl wherein the substituents are selected from the group consisting of halogen, hydroxy, alkyl and alkoxy; X is oxygen or sulfur and Z is alkyl, carbamoyl, alkylcarbamoyl, cycloalkyl, alkoxy, phenyl, substituted phenyl wherein the substituents are selected from the group consisting of halogen, alkyl and alkoxy, phenyl-$C_{1-4}$ alkyl, substituted phenyl-$C_{1-4}$ alkyl wherein the substituent on the phenyl moiety is selected from the group consisting of halogen, alkyl and alkoxy, or a heterocyclic moiety selected from the group consisting of aziridinyl, azetidinyl, pyrrolidyl, piperidyl, hexahydroazepino, morpholino, piperidino, thiazolidinyl, p-thiazinyl and piperazinyl; and $R_2$ is alkyl, alkenyl, substituted alkyl, alkynyl, carboxy, alkoxy, alkylthio, diloweralkylamino or a heterocyclic moiety selected from the group consisting of pyrrolidinyl, piperazinyl, morpholino, thiazolidinyl and thiazinyl.

2. A composition with enhanced antihypertensive activity which comprises an effective dosage having a ratio ranging from about 1 to 10 parts by weight of hydralazine to 1 part by weight of a β-adrenergic blocking agent of the formula:

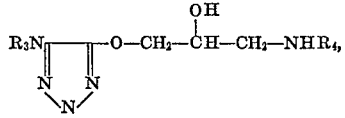

pharmaceutically acceptable salts or optically active isomers thereof wherein $R_3$ is selected from the group consisting of halogen, alkyl, alkoxy, phenyl, benzyl, morpholino, N-alkylpiperazinyl, hydroxypiperidino and piperidino; and $R_4$ is alkyl or hydroxyalkyl.

3. A composition according to claim 2 wherein $R_3$ is morpholino, $R_4$ is t-butyl and the combining ratio is 1:10 by weight.

4. A composition according to claim 3 which comprises 5 mg. of 3-morpholino-4-(3-t-butylamino-2-hydroxypropoxy)-1,2,5-thiadiazole hydrogen maleate and 50 mg. of hydralazine.

5. A composition according to claim 4 wherein 3-morpholino - 4 - (3 - t-butylamino-2-hydroxypropoxy)-1,2,5-thiadiazole hydrogen maleate is in the (−) isomeric form.

6. A composition according to claim 4 wherein 3-morpholino - 4 - (3 - t-butylamino-2-hydroxypropoxy)-1,2,5-thiadiazole hydrogen maleate is in the (+) isomeric form.

7. A method of treating a patient suffering from hypertension which comprises the coadministration of a therapeutically effective amount of hydralazine and a β-adrenergic blocking agent combined in a weight ratio ranging from about 1:1 to 1:10 (β-adrenergic blocking agent to hydralazine) said β-adrenergic blocking agent having the formula:

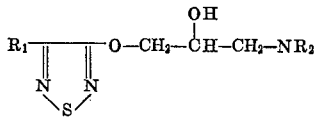

pharmceutically acceptable salts or optically active isomers thereof wherein $R_1$ is hydrogen, halogen, alkyl, alkenyl, Y—X—Z radical wherein Y is alkyl, phenyl or substituted phenyl wherein the substituents are selected from the group consisting of halogen, hydroxy, alkyl and alkoxy; X is oxygen or sulfur and Z is alkyl, carbamoyl, alkylcarbamoyl, cycloalkyl, alkoxy, phenyl, substituted phenyl wherein the substituents are selected from the group consisting of halogen, alkyl and alkoxy, phenyl-$C_{1-5}$ alkyl, substituted phenyl-$C_{1-5}$ alkyl wherein the substituent on the phenyl moiety is selected from the group consisting of halogen, alkyl and alkoxy, or a heterocyclic moiety selected from the group consisting of aziridinyl, azetidinyl, pyrrolidyl, piperidyl, hexahydroazepino, morpholino, piperidino, thiazolidinyl, p-thiazinyl and piperazinyl; and $R_2$ is alkyl, alkenyl, substituted alkyl, alkynyl, carboxy, alkoxy, alkylthio, diloweralkylamino or a heterocyclic moiety selected from the group consisting of pyrrolidinyl, piperazinyl, morpholino, thiazolidinyl and thiazinyl.

8. A method of treating a patient suffering from hypertension which comprises the coadministration of a therapeutically effective amount of hydralazine and a β-adrenergic blocking agent combined in a weight ratio ranging from about 1:1 to 1:10 (β-adrenergic blocking agent to hydralazine) said β-adrenergic blocking agent having the formula:

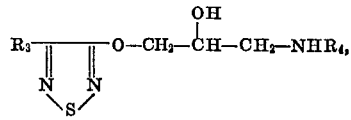

pharmaceutically acceptable salts or optically active isomers thereof wherein $R_3$ is selected from the group consisting of halogen, alkyl, alkoxy, phenyl, benzyl, morpholino, N-alkylpiperazinyl, hydroxypiperidino and piperidino; and $R_4$ is alkyl or hydroxyalkyl.

9. A method according to claim 8 wherein $R_3$ is morpholino, $R_4$ is t-butyl and the combining ratio is 1:10 by weight.

10. A method according to claim 9 which comprises 5 mg. of 3-morpholino-4-(3-t-butylamino-2-hydroxypropoxy)-1,2,5-thiadiazole hydrogen maleate and 50 mg. of hydralazine.

11. A method according to claim 10 wherein 3-morpholino - 4 - (3-t-butylamino - 2 - hydroxypropoxy)-1,2,5-thiadiazole hydrogen maleate is in the (−) isomeric form.

12. A method according to claim 10 wherein 3-morpholino - 4 - (3 - t-butylamino-2-hydroxypropoxy)-1,2,5-thiadiazole hydrogen maleate is in the (+) isomeric form.

References Cited

UNITED STATES PATENTS

| 2,484,029 | 10/1949 | Hartmann et al. | 260—250 |
| 3,655,663 | 4/1972 | Wasson | 260—247.1 |

SAM ROSEN, Primary Examiner

U.S. Cl. X.R.

424—246, 250, 267, 270

UNITED STATES PATENT AND TRADEMARK OFFICE
CERTIFICATE OF CORRECTION

PATENT NO. : 3,833,727
DATED : September 3, 1974
INVENTOR(S) : Carl E. Nelson
Alexander Scriabine It is certified that error appears in the above-identified patent and that said Letters Patent are hereby corrected as shown below:

In Claim 2., column 5, line 73, the formula

"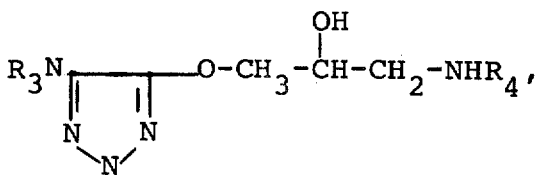"

should read

--- 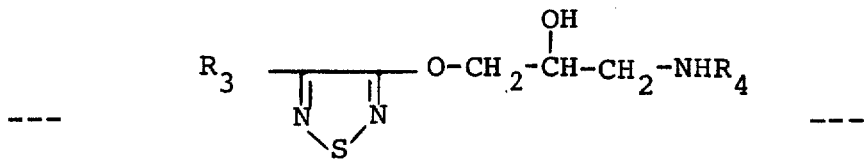 ---

Signed and Sealed this

First Day of February 1977

[SEAL]

Attest:

RUTH C. MASON
Attesting Officer

C. MARSHALL DANN
Commissioner of Patents and Trademarks